United States Patent
Dombroski et al.

(10) Patent No.: US 10,618,351 B2
(45) Date of Patent: Apr. 14, 2020

(54) REMOVABLE SPINDLE AXLE SEALING MECHANISM

(71) Applicants: Henry Dombroski, Boynton Beach, FL (US); Anthony Cunningham, Boynton Beach, FL (US)

(72) Inventors: Henry Dombroski, Boynton Beach, FL (US); Anthony Cunningham, Boynton Beach, FL (US)

(*) Notice: Subject to any disclaimer, the term of this patent is extended or adjusted under 35 U.S.C. 154(b) by 218 days.

(21) Appl. No.: 15/891,587

(22) Filed: Feb. 8, 2018

(65) Prior Publication Data

US 2018/0162163 A1   Jun. 14, 2018

(51) Int. Cl.
| | |
|---|---|
| *B60B 35/00* | (2006.01) |
| *B60B 35/04* | (2006.01) |
| *B60G 7/00* | (2006.01) |
| *B60G 11/18* | (2006.01) |
| *B60B 35/14* | (2006.01) |

(52) U.S. Cl.
CPC ............ *B60B 35/004* (2013.01); *B60B 35/04* (2013.01); *B60B 35/14* (2013.01); *B60B 2320/10* (2013.01); *B60B 2900/511* (2013.01); *B60G 7/008* (2013.01); *B60G 11/181* (2013.01); *B60G 2202/134* (2013.01); *B60Y 2200/147* (2013.01)

(58) Field of Classification Search
CPC ....... B60B 35/004; B60B 35/04; B60B 35/14; B60B 2900/511; B60G 7/02; B60G 7/008; B60G 11/181
USPC .......................................... 301/126, 131, 132
See application file for complete search history.

(56) References Cited

U.S. PATENT DOCUMENTS

| | | | | |
|---|---|---|---|---|
| 1,086,166 | A | * | 2/1914 | Hall ............................... 301/132 |
| 2,501,579 | A | * | 3/1950 | Pointer ................... B60B 35/02 188/206 R |
| 5,090,778 | A | * | 2/1992 | Laudszun ............. F16B 39/028 301/105.1 |
| 5,226,691 | A | * | 7/1993 | Kane ........................ B60B 35/02 301/130 |
| 5,757,084 | A | * | 5/1998 | Wagner .................. B60B 27/001 301/105.1 |
| 6,299,259 | B1 | * | 10/2001 | MacKarvich ........... B60B 35/08 301/127 |
| 6,641,229 | B1 | * | 11/2003 | Kosak ..................... B60B 35/04 29/520 |
| 7,125,084 | B2 | | 10/2006 | Dombrowski et al. |
| 7,185,955 | B2 | | 3/2007 | Dombroski |
| 7,226,133 | B2 | | 6/2007 | Dombroski et al. |
| 7,234,783 | B2 | | 6/2007 | MacKarvich |
| 7,740,036 | B2 | | 6/2010 | Dombroski et al. |

(Continued)

*Primary Examiner* — Kip T Kotter
(74) *Attorney, Agent, or Firm* — McHale & Slavin, P.A.

(57) ABSTRACT

A removable spindle axle improvement using a cap attached to a rim formed along an inside surface of a torsion arm, wherein the cap seals a threaded fastener. The rim used for attachment can be a groove, collar, or a collared washer. In an alternative embodiment, a first O-ring is positioned along an end of a spindle axle tapered body and a second O-ring groove is positioned along an opposite end of the spindle axle tapered body to hermetically seal an area of the spindle axle therebetween. In a further embodiment, a first O-ring is positioned along one end of a spindle axle socket and a second O-ring is positioned along a second end of the spindle axle socket to hermetically seal an area of the spindle axle therebetween.

10 Claims, 6 Drawing Sheets

(56) References Cited

U.S. PATENT DOCUMENTS

| | | | |
|---|---|---|---|
| 8,205,526 B2 | 6/2012 | Dombroski | |
| 2015/0145229 A1* | 5/2015 | Dunlap | B60G 11/225 |
| | | | 280/124.125 |
| 2017/0297404 A1 | 10/2017 | Goettker | |

* cited by examiner

REMOVABLE SPINDLE AXLE SEALING MECHANISM

FIELD OF THE INVENTION

The invention is related to the field of trailer axles and, in particular, to a sealing mechanism for a torsion axle or the like assembly.

BACKGROUND OF THE INVENTION

A conventional boat trailer utilizes an axle secured to a trailer frame to support a wheel. The wheel is coupled to the axle by use of a wheel hub assembly. The wheel hub assembly employs inner and outer bearings with an associated inner and outer race, which permits rotational movement in relation to the axle. Proper lubrication of the bearings is critical in controlling heat and premature bearing wear. Larger trailers require a braking system, which can further add to the heat buildup.

Torsion axles are now commonly used on light weight trailers, wherein a spindle axle is welded into a torsion arm. The torsion arm is further welded to a square bar that is seated inside a square shaped axle beam. The four inside corners of the square axle beam accept rubber cords that provide resistance to the rotation of the torsion bar, yet provide unique cushioning to provide a softer ride.

Problems with the axles and the wheel assemblies are pronounced when the trailers are used to transfer boats, especially those used in salt water. For instance, a boat trailer may have been pulled for a long period of time, causing the axle and wheel assembly to heat up. The boat trailer may be placed in the water before the metals have cooled, such as when unloading the boat. The heat build-up during normal operation of the trailer (i.e. bearing rotation and brake application) can result in very high axle and wheel assembly temperatures wherein no conventional corrosion inhibitor will provide adequate protection.

While axle assemblies, wheel assemblies, and brake assemblies could be constructed from high quality materials to lessen corrosion, the costs make it prohibitively expensive for the consumer. Further, even if an assembly is constructed from high quality materials, ions from dissimilar materials will tend to leach, leading to galvanic corrosion, especially when the materials are subjected to salt water.

U.S. Pat. No. 6,299,259 discloses a removable spindle axle for torsion axle assembly. In this disclosure, a torsion axle assembly has removable and replaceable spindle axles. The assembly comprises a tubular axle beam, an inner torsion bar seated inside the tubular axle beam, rubber cords positioned in the four corners of the tubular axle beam for providing resistance to the inner torsion bar, torsion arms rigidly secured to the inner torsion bar at opposing ends thereof, and removable spindle axles. A removable spindle axle generally includes a body of defined taper arranged and configured to be mounted in abutment with the spindle axle socket of the torsion arms, a threaded fastener for securing the spindle axle to the torsion arm, and a spindle end that is arranged and configured to mount a wheel and hub assembly thereon. A damaged spindle can be the result of many different circumstances, but commonly is the result of wheel bearing damage.

While the concept was to provide a readily removable and replaceable spindle, in reality, the spindle becomes nearly impossible to remove without great effort. The problem is a result of corrosion involving the threaded fastener; also known as a castle nut. The threaded fastener is typically used with a flat beveled washer and a cotter pin to prevent removal. It is impractical to match all the materials used in manufacturing, or employ materials having no iron content, making galvanic action. Most cost effective stainless steels include iron, which will begin to oxidize when exposed to an electrolyte, water being a known electrolyte. While water enables oxidation, salt water is a very good conductor; therefore, galvanic corrosion reactions are tremendously accelerated by salt water. Metal atoms can react with other elements, becoming charged. Once charged, they are attracted to water molecules and dissolve. For this reason, it is common for the threaded fastener, washer and cotter pin to become so corroded they have to be cut off from a stainless steel spindle.

U.S. Publication No. 2017/0297404 discloses a removable spindle assembly for torsion axles. In this disclosure, a torsion axle arrangement is provided, wherein the spindle is mounted to the suspension link by insertion into a split socket at one end of the suspension link, which is inclined with respect to the longitudinal axis of the suspension link. That connection is maintained by a bolt passing through the suspension link, engaging a mating groove in the spindle, and then clamping the ends of the split socket together. The bolt is anchored to the suspension link by a threaded connection external to the suspension link. A chamfer or surface recess is formed in the surface of the suspension link for immediate source identification.

U.S. Publication 2015/0145229 discloses a removable spindle assembly for torsion axles. In this disclosure, a torsion axle arrangement is provided, wherein the spindle is mounted to the suspension link by a keyed connection facilitated with a selectively orientable disc, then fixed to the suspension link according to a given application. That connection is maintained by a bolt passing through the suspension link and engaging a mating groove in the spindle. The bolt is anchored within the suspension link by a threaded connection internal to the suspension link. The shape of the key can be selected as desired for immediate source identification.

U.S. Pat. No. 7,234,783 discloses an axle with removable spindle and cam key. In this disclosure, the axle assembly includes a spindle that extends through a mounting collar into the open end of the axle. A cam key moves through a key hole in the axle and registers with the cam slot of the spindle. The cam surface of the cam key is reversible, with the cam surface engaging either the bearing surface or the bearing surface of the spindle, to urge the spindle into or out of the axle.

What is needed in the industry is a sealing mechanism for a torsion axle assembly so as to maintain the ability to remove a spindle during the life of the assembly.

SUMMARY OF THE INVENTION

Disclosed are improvements for use with removable spindle axles. A removable spindle axle defined in this specification is used with a torsion arm having an inside surface and an outside surface with a tapered open-ended spindle axle socket therebetween. A spindle axle is attached to the arm, having a proximal end and a distal end. The proximal end includes a tapered body for mounting in the spindle axle socket, such that the proximal end extends through the spindle axle socket. A threaded fastener is tightened to the proximal end, securing the spindle axle to the torsion arm. A hub assembly is then securable to the distal end of the spindle axle. One improvement is the use of a cap constructed and arranged to be attached to a reciprocal rim like structure that can be formed along an inside surface of the torsion arm, wherein the cap seals the threaded fastener from exposure to all environmental elements. The rim can be a groove or collar formed in the torsion arm around the threaded fastener. The rim may also be formed on a collared washer that is positioned between the threaded fastener and the housing.

In an alternative embodiment, or in addition to the cap, a first O-ring groove is formed along a first end of the tapered body for receipt of a first O-ring, and a second O-ring groove is formed along a second end of said tapered body for receipt of a second O-ring; the first and second o-rings hermetically seal an area of said spindle axle.

In a further embodiment, or in addition to the cap, a first O-ring groove is formed along a first end of the spindle axle socket for receipt of a first O-ring and a second O-ring groove formed along a second end of the spindle axle socket for receipt of a second O-ring, wherein the first and second O-ring hermetically seal an area of the spindle axle therebetween.

An objective of the instant invention is to provide a groove in the housing around the spindle securement threaded fastener which is constructed to receive a cap to protect the spindle securement threaded fastener from corrosion.

Still another objective of the instant invention is to provide a collar around the spindle securement threaded fastener which is constructed to receive a cap to protect the spindle securement threaded fastener from corrosion.

Still another objective of the instant invention is to provide a collared washer around the spindle securement threaded fastener which is constructed and arranged to receive a cap to protect the spindle securement threaded fastener from corrosion.

Yet still another objective of the instant invention is to position O-ring grooves and O-rings on both ends of the tapered spindle to hermetically seal the tapered spindle to the housing to prevent corrosion of the tapered spindle and the housing.

Another objective of the instant invention is to position O-ring grooves and O-rings on both ends of the housing to hermetically seal the spindle to the housing to prevent corrosion of the spindle and the housing.

Another objective of the instant invention is to provide a means for sealing a spindle to a housing using either O-ring grooves and O-rings on both ends of the tapered spindle or housing, and use a cap to protect the spindle securement threaded fastener from corrosion by either a housing groove, housing collar, or a collar washer for holding the cap around the spindle securement threaded fastener.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
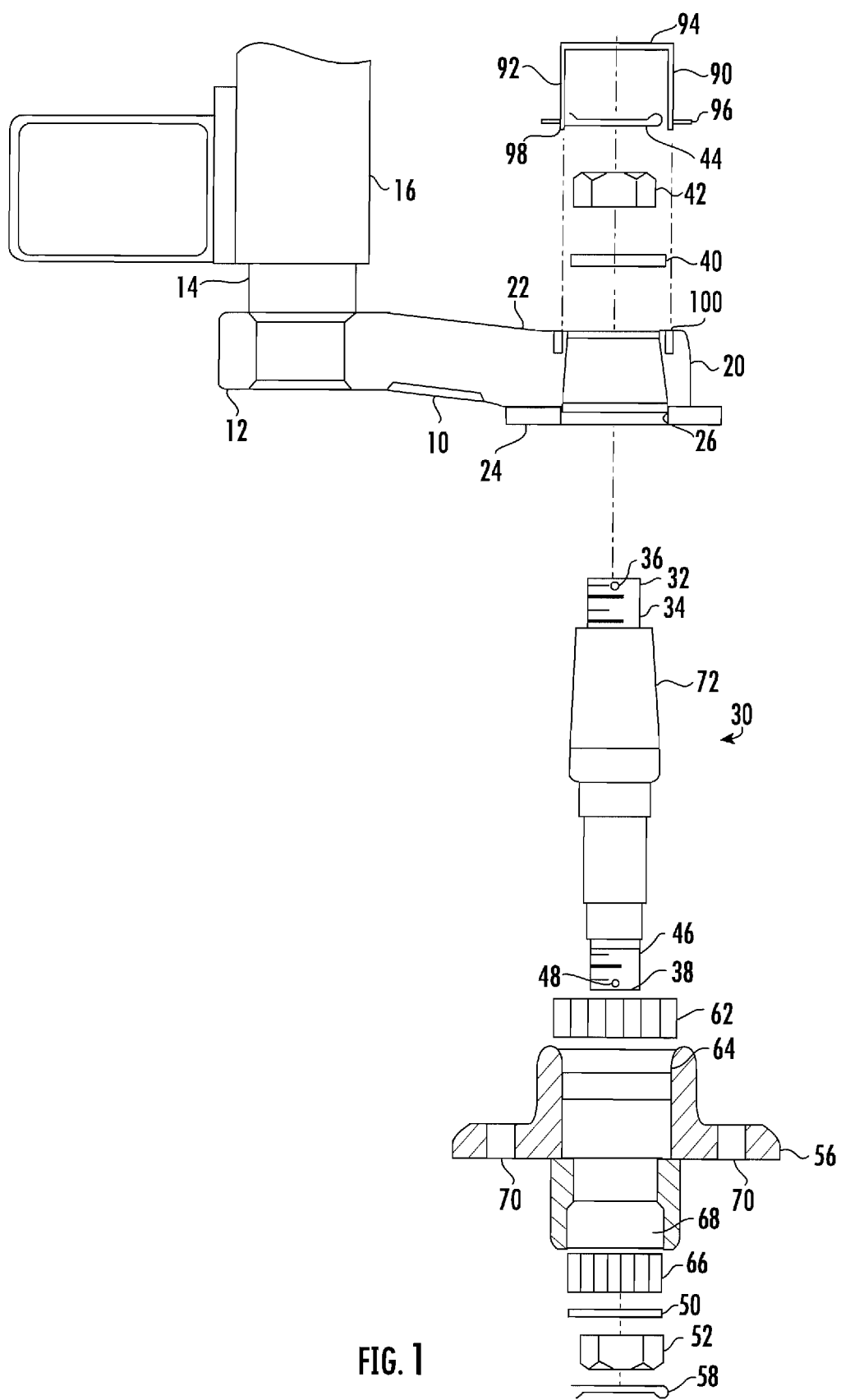
FIG. 1 is an exploded cross sectional side view of a spindle assembly with a grooved housing and fastener cover.

Referring to FIG. 1, illustrated is an exploded cross sectional side view of a spindle assembly with a grooved housing and a fastener cover. The torsion arm 10 has a proximal end 12 that is coupled to a torsion bar 14. The torsion bar 14 in the preferred embodiment has a square shaped bar placed within a square tube housing 16, which has rubber piping positioned along each inner corner of the square tube housing. The torsion arm 10 is further defined by a distal end 20 with an inside surface 22 and an outside surface 24 defining a tapered open-ended spindle axle socket 26 therebetween.

A spindle axle 30 is releaseably secureable to the torsion arm 10; the spindle axle having a proximal end 32 that is threaded 34 with a first cotter key hole 36. The proximal end 32 is the recipient of a washer 40 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives washer 50 and threaded fastener 52 to secure the distal end to the wheel hub assembly 56 once installed. A second cotter key 58 is positioned in the second cotter key hole 48 to inhibit movement of the threaded fastener 52. The wheel hub assembly includes an inner bearing 62 for engaging an inner race 64 and an outer bearing 66 for engaging an outer race 68. The hub assembly 56 is used for mounting a wheel, not shown, using the wheel bolt holes 70.

The spindle axle 30 includes a tapered body 72 for mounting in the spindle axle socket 26 of the torsion arm 10, such that the proximal end 32 extends through the spindle axle socket 26 to the inside surface 22. The threaded fastener 42 is tightened to the proximal end 32 with reciprocal threads 34, securing the spindle axle 30 to the torsion arm 10. In this embodiment, a cap 90 is used to protect the proximal end 32 of the spindle body, including the threaded fastener 42, washer 40, and cotter pin 44 from exposure to all environmental elements. In particular, the area around the threaded fastener 42 is prone to severe galvanic corrosion, especially when the trailer is used for salt water boat hauling. The cap 90 resembles a conventional dust cap, having a continuous side wall 92 and top 94. A lip 96 wraps around a circumference of the sidewall 92, which limits depth insertion of a tab section 98, part of the continuous wall created beneath the lip 96. The tab section 98 frictionally engages a groove 100 formed on the inner surface 22 of the torsion arm 10. Preferably, an anaerobic compound or silicone sealant is used to seal the cap 90 to the torsion arm 10. The threaded fastener 42, washer 40, cotter pin 44, and proximal end 32 are covered with a protectant or grease prior to assembling the cap 90 to the torsion arm 10. The groove is machined into the inner surface 22 of the torsion arm 10, forming a receptacle that is constructed and arranged to frictionally engage the cap 90.

The purpose of having a replaceable spindle body is to permit replacement without having to forgo replacement of the torsion bar or hub assembly. For instance, in the instance of an extreme bearing failure, the spindle will be destroyed. The idea is to have a replaceable spindle that can be repaired on the side of the road. However, galvanic corrosion of the proximal end with dissimilar metals forming the nut, washer and cotter pin are known to prohibit the intended replacement of the spindle body making it necessary to cut or torch off the fastener in an attempt to save the torsion arm. The speed of corrosion of the materials is remarkable, hastened by salt water exposure, as well as cycling of temperature, which occurs when the trailer bearings create heat through normal friction.

Figure 2:
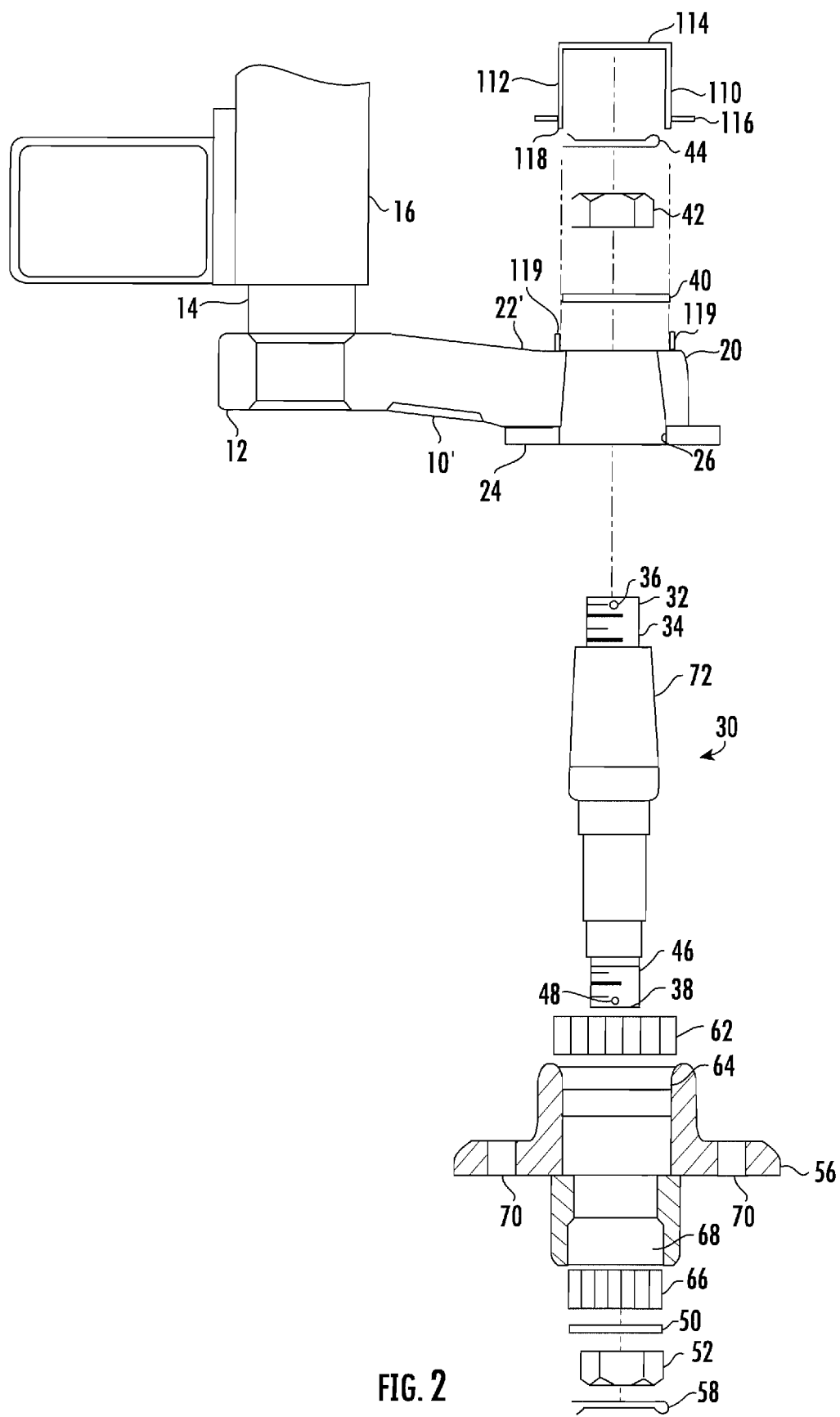
FIG. 2 is an exploded cross sectional side view of a spindle assembly with a collared housing and fastener cover.

FIG. 2 is an exploded cross sectional side view of a spindle assembly with a collared housing and fastener cover. Illustrated is a torsion arm 10 having a proximal end 12 coupled to a torsion bar 14. The torsion bar 14 in the preferred embodiment has a square shaped bar placed within a square tube housing 16. The torsion arm 10' is further defined by a distal end 20 with an inside surface 22' and an outside surface 24 defining a tapered open-ended spindle axle socket 26 therebetween.

The spindle axle 30 is releaseably secureable to the torsion arm 10'; the spindle axle having a proximal end 32 that is threaded 34 with a first cotter key hole 36. The proximal end receives a washer 40 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives the washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel hub assembly includes an inner bearing 62 for engaging an inner race 64 and an outer bearing 66 for engaging an outer race 68. The hub assembly 56 is used for mounting a wheel, not shown, using the wheel bolt holes 70.

The spindle axle 30 includes a tapered body 72 for mounting in the spindle axle socket 26 of the torsion arm 10', such that the proximal end 32 extends through the spindle axle socket 26 to the inside surface 22'. The threaded fastener 42 is tightened to the proximal end 32 with reciprocal threads 34, securing the spindle axle 30 to the torsion arm 10'. In this embodiment, a cap 110 is used to protect the proximal end 32 of the spindle body, including the threaded fastener 42, washer 40, and cotter pin 44 from exposure to all environmental elements. The cap 110 resembles a conventional dust cap, having a continuous side wall 112 and top 114. A lip 116 wraps around a circumference of the sidewall 112, which limits depth insertion of a tab section 118, part of the continuous wall created beneath the lip 116. The tab section 118 frictionally engages a collar 119 formed on the inner surface 22' of the torsion arm 10'. Preferably, an anaerobic compound or silicone sealant is used to seal the cap 110 to the torsion arm 10. The threaded fastener 42, washer 40, cotter pin 44, and proximal end 32 are covered with a protectant or grease prior to assembling the cap 110 to the torsion arm 10'.

The collar 119 is machined into an inner edge of the tapered open-ended spindle axle socket 26. The collar 119 enlarges the edge of the socket 26, forming an opening that is constructed and arranged to frictionally engage the tab 118 of the cap 110.

Figure 3:
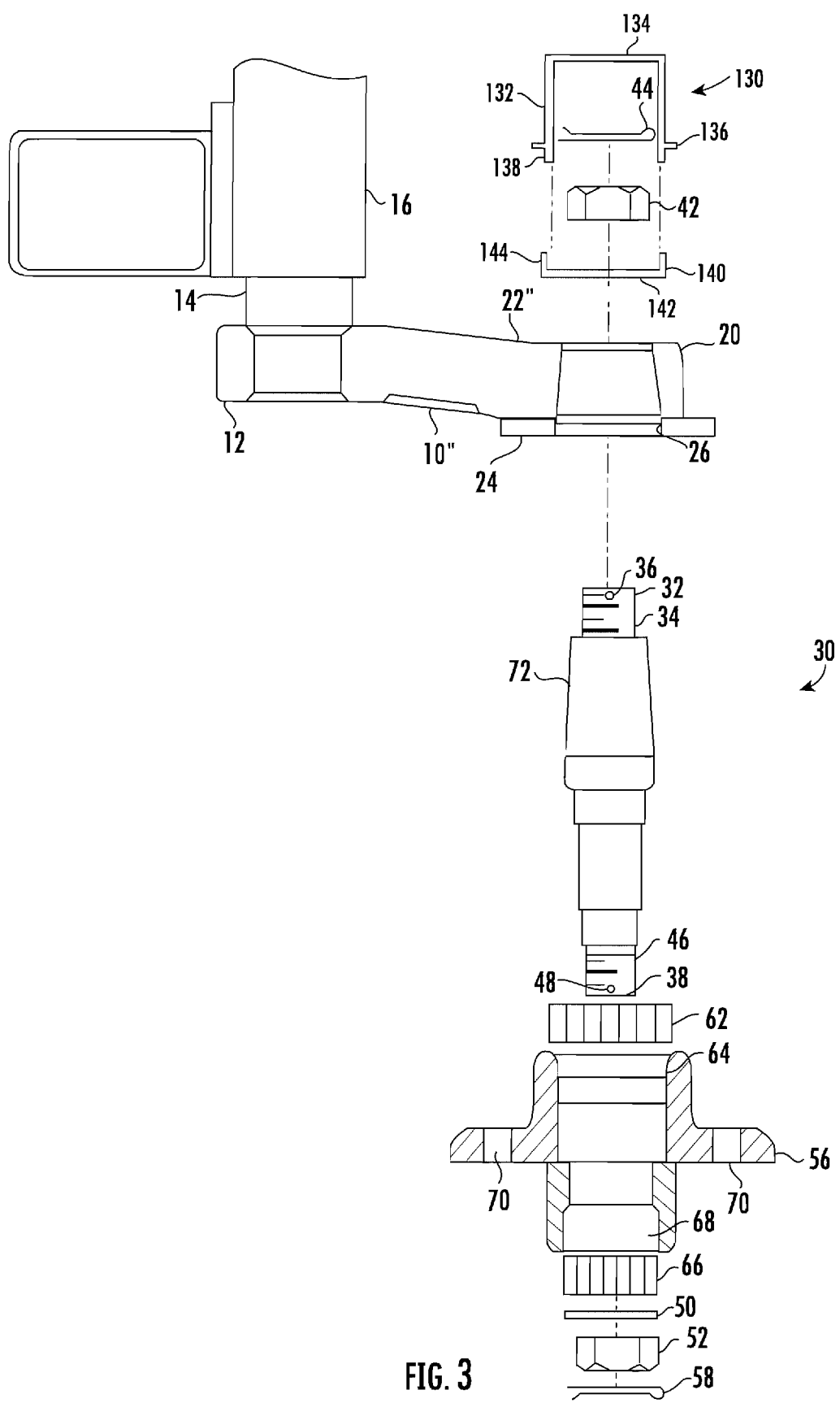
FIG. 3 is an exploded cross sectional side view of a spindle assembly with a collared washer to receive a fastener cover.

FIG. 3 is an exploded cross sectional side view of a spindle assembly with a collared washer to receive a fastener cover. Illustrated is a torsion arm 10" having a proximal end 12 coupled to a torsion bar 14. The torsion bar 14 in the preferred embodiment has a square shaped bar placed within a square tube housing 16. The torsion arm 10" is further defined by a distal end 20 with an inside surface 22" and an outside surface 24 defining a tapered open-ended spindle axle socket 26 therebetween.

The spindle axle 30 is releaseably secureable to the torsion arm 10"; the spindle axle having a proximal end 32 that is threaded 34 with a first cotter key hole 36. The proximal end for receiving a collared washer 140 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives a washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel assembly includes an inner bearing 62 for engaging an inner race 64 and an outer bearing 66 for engaging an outer race 68. The hub assembly is used for mounting a wheel, not shown, using the wheel bolt holes 70.

The spindle axle 30 includes a tapered body 72 for mounting in the spindle axle socket 26 of the torsion arm 10", such that the proximal end 32 extends through the spindle axle socket 26 to the inside surface 22". The threaded fastener 42 is tightened to the proximal end 32 with reciprocal threads 34, securing the spindle axle 30 to the torsion arm 10". In this embodiment, a cap 130 is used to protect the proximal end 32 of the spindle body, including the threaded fastener 42, collared washer 140 and cotter pin 44 from exposure to all environmental elements. The cap 130 resembles a conventional dust cap, having a continuous side wall 132 and top 134. A lip 136 wraps around a circumference of the sidewall 132, which limits depth insertion of a tab section 138, part of the continuous wall created beneath the lip 136. In this embodiment, a collared washer 140 is employed positioned between the threaded fastener and the torsion bar housing 10". The collared washer 140 is defined as a circular plate 142 with a raised rim 144 around an outer diameter of the circular plate 142. The circular plate 142 has a centrally disposed aperture sized to receive the proximal end 32 of the spindle axle 30. The tab section 138 frictionally engages the collar 144. Preferably, an anaerobic compound or silicone sealant is used to seal the cap 130 to the torsion arm 10". The threaded fastener 42, collared washer 140, cotter pin 44, and proximal end 32 are covered with a protectant or grease prior to assembling the cap 110 to the torsion arm 10".

The collared washer 140 is frictionally engaged into the inner edge of the tapered open-ended spindle axle socket 26. Silicone Sealant is used to seal the collared washer 140 to the tapered open ended spindle socket 26. The collar 140 enlarges the edge of the socket 26, forming an opening that is constructed and arranged to frictionally engage the cap tab 138 of the cap 130.

Figure 4:
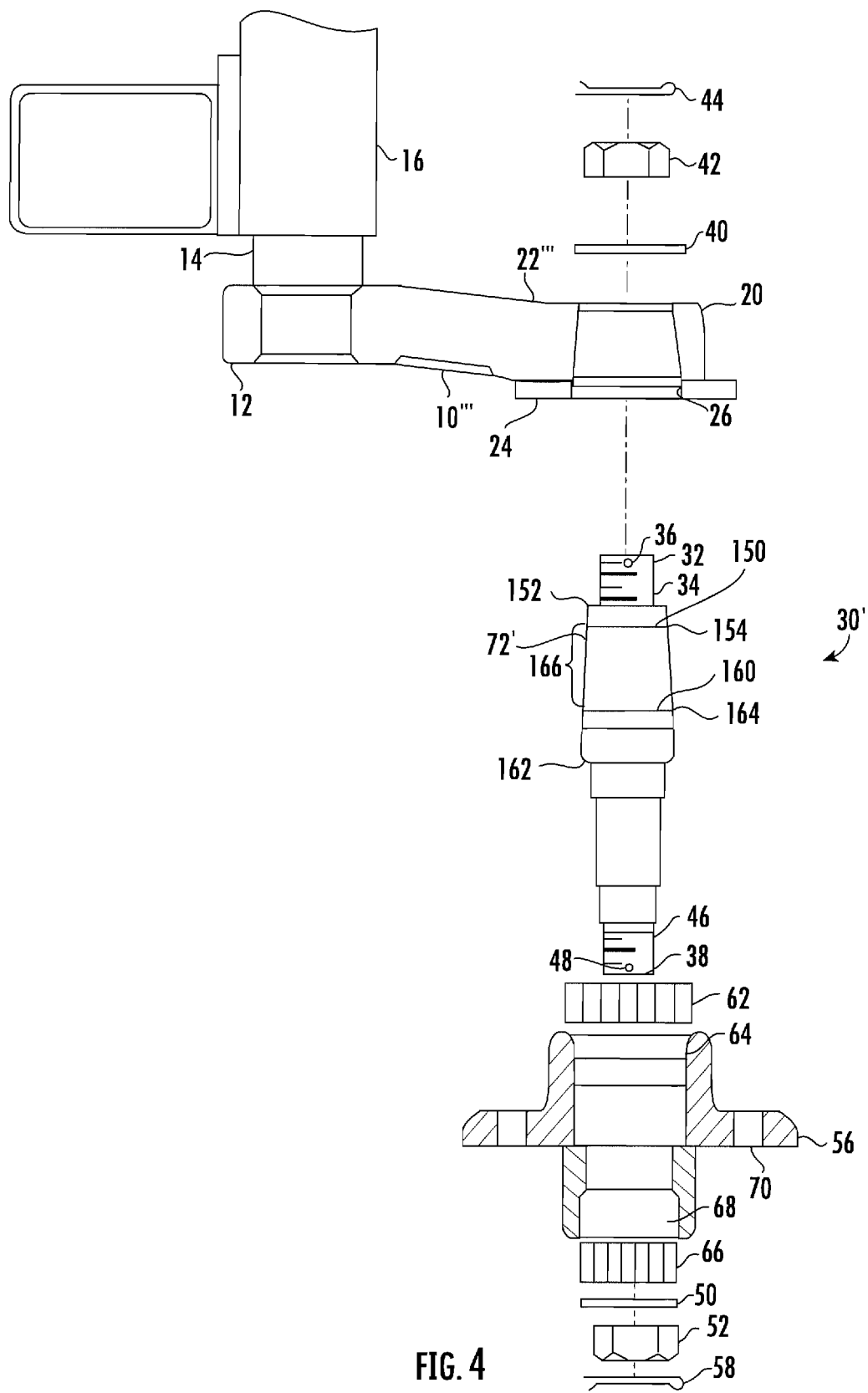
FIG. 4 is an exploded cross sectional side view of a spindle assembly with a modified spindle to form a hermetically sealed spindle.

FIG. 4 is an exploded cross sectional side view of a spindle assembly with a modified spindle to form a hermetically sealed spindle. Illustrated is a torsion arm 10''' having a proximal end 12 coupled to a torsion bar 14. The torsion bar 14 in the preferred embodiment has a square shaped bar placed within a square tube housing 16. The torsion arm 10''' is further defined by a distal end 20 with an inside surface 22''' and an outside surface 24 defining a tapered open-ended spindle axle socket 26 therebetween.

The spindle axle 30' is releaseably secureable to the torsion arm 10'''; the spindle axle having a proximal end 32 that is threaded 34 with a first cotter key hole 36. The proximal end receives washer 40 and threaded fastener 42 to prevent the proximal end from passing through the spindle axle socket 26 once installed. A first cotter key 44 is positioned in the first cotter key hole 36 to inhibit movement of the threaded fastener 42.

The distal end 38 of the spindle axle 30' is threaded 46 with a second cotter key hole 48. The distal end 38 receives washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel assembly includes an inner bearing 62 for engaging an inner race 64 and an outer bearing 66 for engaging an outer race 68. The hub assembly is used for mounting a wheel, not shown, using the wheel bolt holes 70.

The spindle axle 30' includes a tapered body 72' for mounting in the spindle axle socket 26 of the torsion arm 10''', such that the proximal end 32 extends through the spindle axle socket 26 to the inside surface 22'''. The threaded fastener 42 is tightened to the proximal end 32 with reciprocal threads 34, securing the spindle axle 30 to the torsion arm 10'''. In this embodiment, the spindle axle 30 includes a first O-ring groove 150 formed along a first end 152 of the tapered body 72' for receipt of a first O-ring 154. A second O-ring groove 160 is formed along a second end 162 of the tapered body 72' for receipt of a second O-ring 164. The first and second O-rings 154, 164 hermetically seal an area 166 therebetween when the spindle axle 30' is attached to the torsion arm 10'''. It is reminded that the spindle axle does not rotate. By maintaining a hermetically sealed area 166, the spindle cannot seize the torsion arm 10'''. Corrosion that may occur along the first end 152 or second end 162 will not be able to penetrate the O-rings and, during the removal stage, any corrosion will not be sufficient to seize the spindle axle 30' to the torsion arm 10'''. Preferably, the sealed area 166 is covered with a protectant or grease prior to assembling to the torsion arm 10'''.

Figure 5:
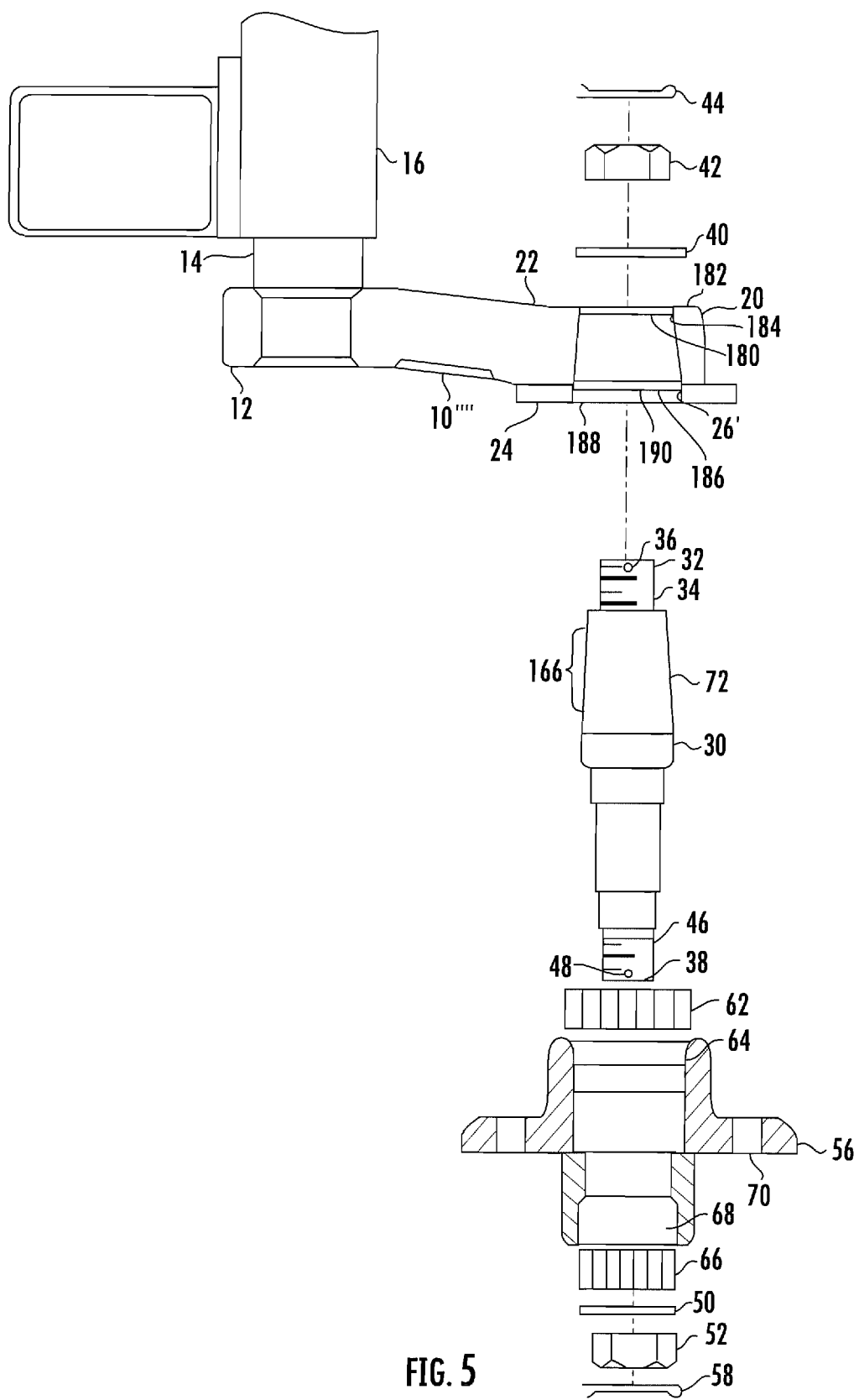
FIG. 5 is an exploded cross sectional side view of a spindle assembly with a modified housing to form a hermetically sealed spindle.

FIG. 5 is an exploded cross sectional side view of a spindle assembly with a modified housing to form a hermetically sealed spindle. Illustrated is a torsion arm 10'''' having a proximal end 12 coupled to a torsion bar 14. The torsion bar 14, in the preferred embodiment, has a square shaped bar placed within a square tube housing 16. The torsion arm 10'''' is further defined by a distal end 20 with an inside surface 22 and an outside surface 24 defining a tapered open-ended spindle axle socket 26' therebetween.

The spindle axle 30 is releaseably secureable to the torsion arm 10''''; the spindle axle having a proximal end 32 that is threaded 34 with a first cotter key hole 36. The proximal end receives washer 40 and threaded fastener 42 to prevent the proximal end from passing through the spindle axle socket 26' once installed. A first cotter key 44 is positioned in the first cotter key hole 36 to inhibit movement of the threaded fastener 42.

The distal end 38 of the spindle axle 30 is threaded 46 with a second cotter key hole 48. The distal end 38 receives a washer 50 and threaded fastener 52 to prevent the distal end from passing through the wheel hub assembly 56 once installed. A second cotter key 58 is positioned in the second cotter key hole 48 to inhibit movement of the threaded fastener 52. The wheel assembly includes an inner bearing 62 for engaging an inner race 64 and an outer bearing 66 for engaging an outer race 68. The hub assembly is used for mounting a wheel, not shown, using the wheel bolt holes 70.

The spindle axle 30 includes a tapered body 72 for mounting in the spindle axle socket 26' of the torsion arm 10'''', such that the proximal end 32 extends through the spindle axle socket 26' to the inside surface 22. The threaded fastener 42 is tightened to the proximal end 32 with reciprocal threads 34 securing the spindle axle 30 to the torsion arm 10''''. In this embodiment, the torsion arm housing 10'''' includes a first O-ring groove 180 formed along a first end 182 of the spindle axle socket 26' near the inner surface 22 for receipt of a first O-ring 184 and a second O-ring groove 186 formed along a second end 188 of the spindle axle socket 26' for receipt of a second O-ring 190. The first and second O-rings 184, 190 hermetically seal an area 166 of the spindle axle 30 when attached to the torsion arm body 10''''.

Figure 6:
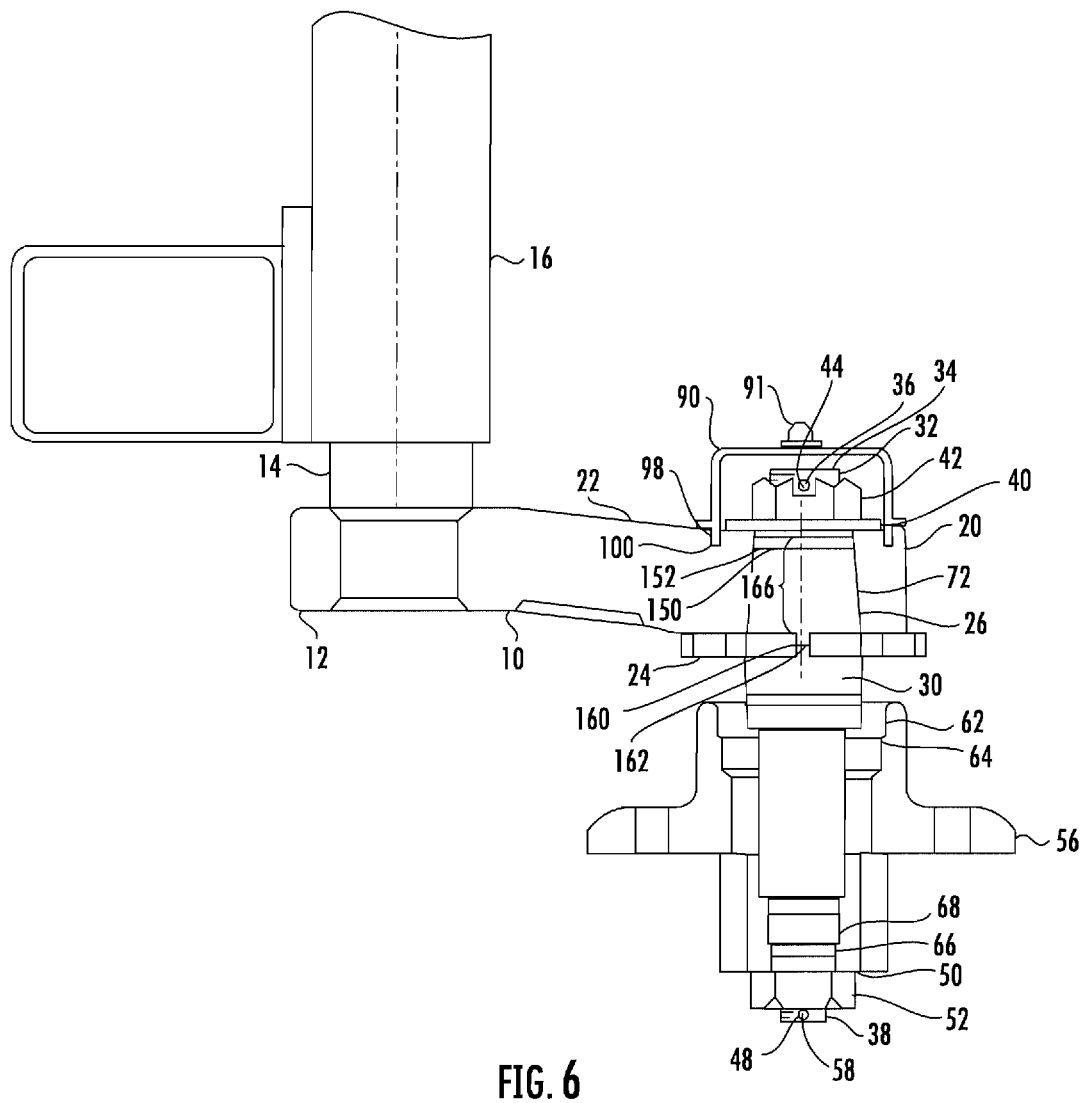
FIG. 6 is a side view of a spindle assembly having a spindle threaded fastener cover and a hermetically sealed spindle.

Referring to FIG. 6, a side view of a spindle assembly with a spindle threaded fastener cover and sealed spindle is depicted. The torsion arm 10 has a proximal end 12 that is coupled to a torsion bar 14. The torsion bar 14, in the preferred embodiment, has a square tube housing 16. The torsion arm 10 is further defined by a distal end 20 with an inside surface 22 and an outside surface 24 defining a tapered open-ended spindle axle socket 26 therebetween.

A spindle axle 30 is releaseably secureable to the torsion arm 10; the spindle axle having a proximal end 32 that is threaded 34 with a first cotter key hole 36. The proximal end 32 receives a washer 40 and threaded fastener 42 to prevent the proximal end 32 from passing through the spindle axle socket 26 once installed. A first cotter key 44 is positioned in a cotter key hole to inhibit movement of the castle nut threaded fastener 42.

The distal end 38 of the spindle axle 30 receives a washer 50 and threaded fastener 52 to prevent the distal end from passing through the wheel hub assembly 56 once installed. A second cotter key 58 is positioned in a second cotter key hole 48 to inhibit movement of the threaded fastener 52. The wheel hub assembly includes an inner bearing 62 for engaging an inner race 64 and an outer bearing 66 for engaging an outer race 68.

Cap 90 is used to protect the proximal end 32 of the spindle body, including the threaded fastener 42, washer 40, and cotter pin 44 from exposure to all environmental elements. The cap 90 resembles a conventional dust cap, and may include a grease zerk fitting 91. Tab section 98 frictionally engages a groove 100 formed on the inner surface 22 of the torsion arm 10. In this embodiment, the spindle axle 30 includes a first O-ring groove 150 formed along one end of the tapered body 72 for receipt of a first O-ring 152.

A second O-ring groove 160 is formed along a second end of the tapered body 72 for receipt of a second O-ring 162. The first and second O-rings 152, 162 hermetically seal an area 166 therebetween when the spindle axle 30 is attached to the torsion arm body 10.

The use of the cap of the instant invention, together with a sealing of the spindle, assures the owner that the spindle can be easily removed should the spindle need to be replaced. The protection of the bearings 62, 66 can further enhance the longevity of the spindle assembly. The Applicant has been awarded a number of patents for protection of the bearings, including U.S. Pat. Nos. 7,125,084; 7,226,133; 7,185,955; 7,740,036; and 8,205,526, the contents of which are incorporated herein by reference.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically.

The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A removable spindle axle assembly defined by a torsion arm having an inside surface and an outside surface defining a tapered open-ended spindle axle socket therebetween; a spindle axle having a proximal end and a distal end, said proximal end including a tapered body for mounting in said spindle axle socket of said torsion arm such that said proximal end extends through said spindle axle socket to said inside surface; a threaded fastener tightened to said proximal end, securing said spindle axle to said torsion arm; and a hub assembly securable to said distal end of said spindle axle, the improvement comprising: a first O-ring groove formed along a proximal end of said tapered body for receipt of a first O-ring, and a second O-ring groove formed along a distal end of said tapered body for receipt of a second O-ring; wherein said first and second O-rings hermetically seal an area of said spindle axle therebetween when said spindle axle is attached to said torsion arm body.

2. The removable spindle axle assembly according to claim 1 including a cap constructed and arranged to attached to a rim formed along an inside surface of said torsion arm, wherein said cap seals said threaded fastener from exposure to all environmental elements.

3. The removable spindle axle assembly according to claim 2 wherein said rim is a groove formed in said torsion arm around said threaded fastener.

4. The removable spindle axle assembly according to claim 2 wherein said rim is a collar formed in said torsion arm around said threaded fastener.

5. The removable spindle axle assembly according to claim 2 wherein said rim formed on a collared washer positioned between said threaded fastener and said housing, said collared washer defined as a circular plate with a raised rim around an outer diameter and a centrally disposed aperture sized to receive said proximal end of said spindle axle.

6. A removable spindle axle assembly defined by a torsion arm having an inside surface and an outside surface defining a tapered open-ended spindle axle socket therebetween; said spindle axle having a proximal end and a distal end, said proximal end including a tapered body for mounting in said spindle axle socket of said torsion arm such that said proximal end extends through said spindle axle socket to the inside surface; a threaded fastener tightened to said proximal end, securing said spindle axle to said torsion arm; and a hub assembly securable to said distal end of said spindle axle, the improvement comprising: a first O-ring groove formed along a proximal end of said spindle axle socket for receipt of said first O-ring, and a second O-ring groove formed along a distal end of said spindle axle socket for receipt of said second O-ring; wherein said first and second O-rings hermetically seal an area of said spindle axle therebetween when said spindle axle is attached to said torsion arm body.

7. The removable spindle axle assembly according to claim 6 including a cap constructed and arranged to attached to a rim formed along an inside surface of said torsion arm wherein said cap seals said threaded fastener from exposure to all environmental elements.

8. The removable spindle axle assembly according to claim 7 wherein said rim is a groove formed in said torsion arm around said threaded fastener.

9. The removable spindle axle assembly according to claim 7 wherein said rim is a collar formed in said torsion arm around said threaded fastener.

10. The removable spindle axle assembly according to claim 7 wherein said rim formed on a collared washer positioned between said threaded fastener and said housing, said collared washer defined as a circular plate with a raised rim around an outer diameter and a centrally disposed aperture sized to receive said proximal end of said spindle axle.

\* \* \* \* \*